(12) United States Patent
Kohno et al.

(10) Patent No.: US 6,523,125 B1
(45) Date of Patent: Feb. 18, 2003

(54) SYSTEM AND METHOD FOR PROVIDING A HIBERNATION MODE IN AN INFORMATION HANDLING SYSTEM

(75) Inventors: Hiroshi Kohno, Pittsburgh, PA (US); Susumu Shimotohno, Hadano (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/331,949
(22) PCT Filed: Jan. 7, 1998
(86) PCT No.: PCT/GB99/00053
§ 371 (c)(1),
(2), (4) Date: Apr. 28, 2000
(87) PCT Pub. No.: WO99/35576
PCT Pub. Date: Jul. 15, 1999

(30) Foreign Application Priority Data

Jan. 7, 1998 (JP) ............................................. 10-001253

(51) Int. Cl.[7] .................................................. G06F 1/13
(52) U.S. Cl. ........................................ 713/320; 713/323
(58) Field of Search ................................. 713/310, 320, 713/324, 330, 340, 323

(56) References Cited

U.S. PATENT DOCUMENTS

| | | | | |
|---|---|---|---|---|
| 5,666,540 A | * | 9/1997 | Hagiwara et al. | ............ 713/300 |
| 5,680,540 A | | 10/1997 | Pearce | .................... 395/182.22 |
| 6,049,884 A | * | 4/2000 | Tsuji | ........................... 713/323 |
| 6,154,846 A | * | 11/2000 | Arai | ............................. 713/323 |

FOREIGN PATENT DOCUMENTS

| | | | | |
|---|---|---|---|---|
| EP | 0 636 981 | * | 7/1994 | |
| EP | 0 636 983 | * | 7/1994 | |
| EP | 0636981 A1 | | 2/1995 | ........... G06F/11/14 |
| EP | 0658843 A1 | | 6/1995 | ........... G06F/11/14 |
| EP | 0793175 A1 | | 9/1997 | ........... G06F/11/14 |

* cited by examiner

*Primary Examiner*—Peter Wong
*Assistant Examiner*—Raymond N Phan
(74) *Attorney, Agent, or Firm*—Douglas W. Cameron; Anne Vachon Dougherty (57) ABSTRACT

To provide an information handling system and a method of controlling the same which allows the state of the system to be saved without destructing other user data on an external storage device. When a predetermined event occurs, the system saves hibernation information in a hibernation information storing area on a hard disk. A hibernation managing information storing area is provided in the outermost cylinder of the hard disk. A boot sector already exists in the outermost cylinder. Therefore, the hibernation managing information is written in the outermost cylinder after the boot sector has been sheltered to the hibernation information storing area. After such series of processes have been completed, the system shifts to a hibernation mode. On the other hand, when power feeding to the system is resumed, the hibernation information is read out to check whether or not the system was in the hibernation mode, etc. The hibernation information saved in the hibernation information storing area is restored to the original place and writes the master boot record which was sheltered to the hibernation information storing area back to the outermost cylinder.

30 Claims, 6 Drawing Sheets

SYSTEM AND METHOD FOR PROVIDING A HIBERNATION MODE IN AN INFORMATION HANDLING SYSTEM

FIELD OF THE INVENTION

This invention relates to an information handling system typically represented by a personal computer and a method of controlling the same and, particularly, to an information handling system of a type which implements a low power consumption technology which causes the system to enter a state in which a task under execution is interrupted upon occurrence of a predetermined event with the operation of the system halted almost completely and a method of controlling such information handling system. More particularly, this invention relates to an information handling system of a type which shifts to a low power consumption mode after saving the system conditions in an external storage device such as a hard disk and restores the original operation mode by restoring the saved conditions and which is capable of saving the system conditions without destructing user data existing on the external storage device, and a method of controlling such information handling system.

BACKGROUND OF THE INVENTION

Along with recent technological revolution, various types of personal computers (PC) including a desk top type, a tower type and a notebook type have been developed and sold. Among them, the desk top PC is characterized in that the size is relatively large, the weight is relatively heavy and it is installed for use in a fixed place in an office or home. A notebook PC is designed and manufactured in a small size and a light weight in consideration of use in a mobile environment, that is, portable use in outdoor or a place where it is brought out. A typical example of a notebook PC is "IBM ThinkPad 770" series (trademark of International Business Machines Corporation) sold by IBM Japan Co., Ltd.

Figure 6:
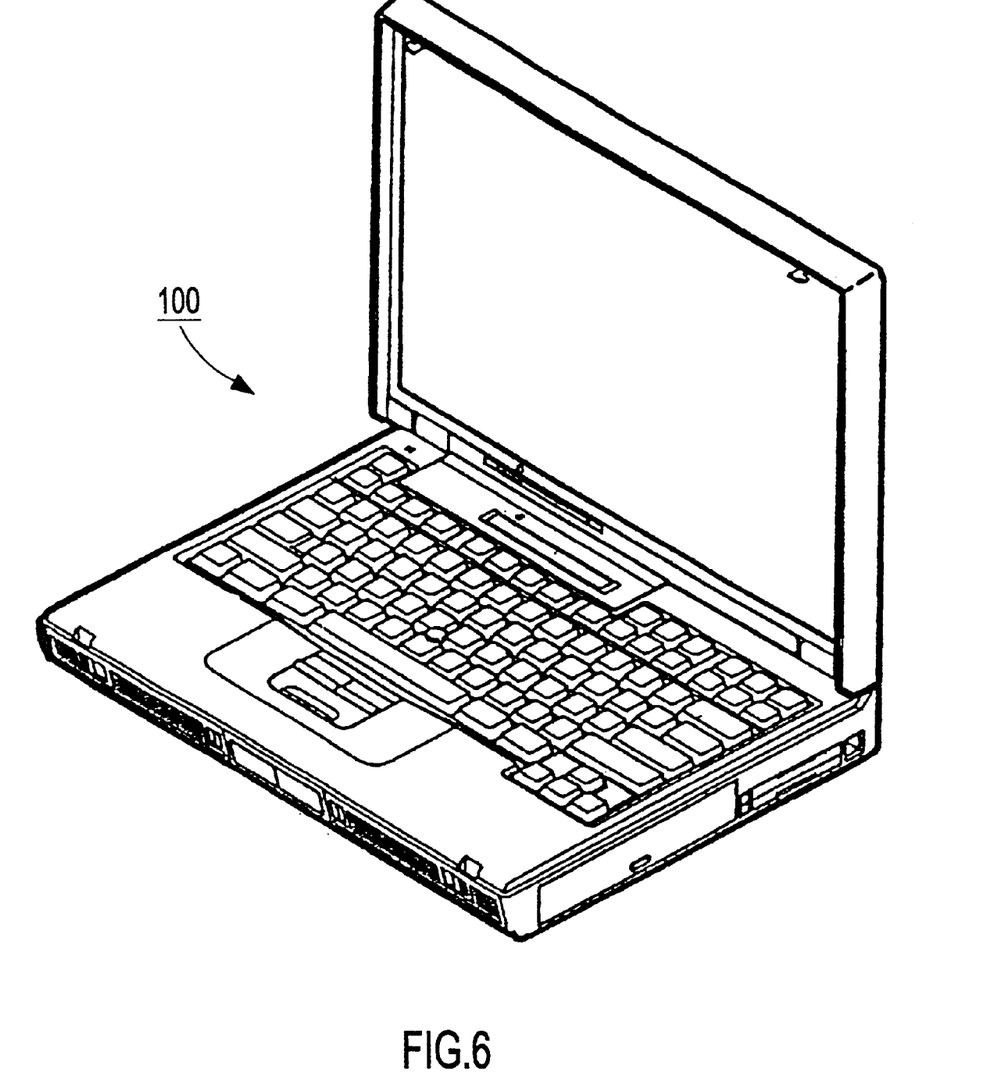
FIG. 6 shows an external appearance of a notebook PC.

As well known, a notebook PC is of a "clam shell structure" comprising a system unit which internally installs a system board and a lid which is pivotally attached to a substantially rear edge of the unit (refer to FIG. 6). A keyboard unit is disposed as an input device on the top surface of the system unit while a liquid crystal display is disposed as an output device substantially in the middle of the inside of the lid. When a notebook PC is used, the lid is opened from the system unit to allow the display and the keyboard to be usable. On the other hand, the lid is closed to the system unit when the notebook PC is not used or is transported to hide the display and the keyboard for protecting them from an external impact. The PC can install a hard disk drive (HDD), a floppy disk drive (FDD) and a CD-ROM drive as an external storage device. These drives are typically formed in a shape of a package so as to allow them to be attached, detached and exchanged at will.

Almost all PCs are of a "battery driven" type which can be driven by an internal battery. This is in consideration of a use in a mobile environment where a commercial power is not available. A battery internally installed in a notebook PC is generally in a form of a "battery pack" which contains a plurality of secondary battery cells such as Li-Ion, NiCd and NiMH cells. Such battery pack is typically of several hundreds grams of weight and has 4–12 volts output voltage.

The popularization and performance of a battery driven equipment depend on the effective utilization of a battery. Taking a battery pack of a notebook PC for example, it takes 2–3 hours to charge the pack despite the charged capacity is only enough to supply no more than 2–3 hours at most of computer processing time. Such a long charging time is a problem in using a battery driven equipment and this leads to a necessity for a user to have to carry a plurality of spare battery packs.

In view of the above, a technology of reducing power consumption has been researched and developed to extend the length of durable time of a battery as long as possible and have been employed in a battery driven equipment like a notebook PC.

Also, from a social ecological view point of limited resources, a demand for saving power consumption has been recently emphasized even for an electronic equipment which can be fed from a commercial power source unlimitedly. For example, the US Environment Protection Agency (EPA) publicized a self imposed regulation of saving power consumption called "Energy Star Computer Program" in June 1993. This regulation requires that the power consumption of a PC in a stand-by state is below a given criteria (driving power is no more than 30 watts or 30% of a power in operation of a PC). From this reason, computer manufacturers have been competing in implementing a power save technology even in a desk top PC.

Among the various technologies of reducing power consumption for electronic equipments, one applied to a PC may be called "power management".

The principal mechanism of the power management is to put a hardware which need not be driven to a power save mode or to stop feeding depending on the activity of a computer system (hereinafter may be simply referred to a "system"). Example of the power management includes "LCD off", "HDD off" and "CPU slow clock/clock down".

"LCD off" stops feeding an LCD or a back light thereof in the absence of an input from the keyboard or a mouse over more than a predetermined length of time. "HDD off" stops feeding circuits inside a HDD unit depending on the length of time measured from the latest disk access and is described in the specification of U.S. Pat. No. 4,933,785, for example. Because the back light of LCD and a drive motor of HDD occupy a large percentage of the total power consumption of a system, "LCD off" and "HDD off" contribute largely to power saving.

"CPU slow clock" and "CPU clock down" reduce the power consumption of the CPU by lowering the operating frequency of the CPU or stopping the clock completely during a stand-by time of the CPU (when there is no key/mouse input from a user over more than a predetermined length of time, for example). Because the processing capability of a CPU has been greatly enhanced while, on the other hand, the power consumption and heat generation of the CPU tend to increase due to the increasing speed of the CPU recently, "CPU slow clock/clock down" gives a significant technical merit. Incidentally, "CPU slow clock/clock down" is disclosed, for example, in the specification of Japanese patent application 7-278904 (PUPA 9-128106, Applicant Docket No. JA995100) assigned to the applicant of the present patent application.

The above described "LCD off", "HDD off" and "CPU slow clock/clock down", etc., reduce power consumption by halting a part of hardwares within the system while the rest of the hardwares continue to consume electric power. However, if feeding to the system can be almost completely stopped, it is needless to say that the effect of reduced power consumption will be further improved. In the case of chargeable battery, degradation of the battery may be induced if the battery continues to be discharged in a "low battery" condition in which the remaining capacity is below a predetermined value. It is therefore desirable to completely stop feeding to the system when the battery is in a low battery condition.

So called "hibernation" is a power management technology which enables feeding to the system to be completely stopped. The system is triggered to shift to a hibernation state by interrupting a task under execution when a key/mouse input or the activity of I/O device is not detected over more than a predetermined length of time or the battery is in a low battery state. Restoration of a system from the hibernation mode is called "wake up". The "wake up" restores the system to an original state to resume the task and is distinguished from the usual power-on (POR: Power on Reset) which resets the state of the system.

In order to resume the task by wake up, that is, to restore the state of the system at the point of time when the task was interrupted, it is necessary to save the state of the system before it enters a hibernation mode. The state of the system as meant here in this specification includes information of the content of a volatile memory such as a main memory and a VRAM as well as a value in registers of the CPU and I/O devices and a context of hardware such as a count value of a timer. By returning saved data to the original places during wake up, the state of the system is restored. The information which is saved for restoring the state will be hereinafter referred to "hibernation information".

Taking into consideration the fact that power feeding to all hardwares in the system is stopped in the hibernation mode, it is preferable that the place of saving the hibernation information is a non-volatile storage location like a hard disk. It is thus necessary to reserve a dedicated area on the hard disk for saving the hibernation information.

As one of the approach to reserving an area on the hard disk, a partition dedicated to the hibernation information may be preserved on the hard disk. Alternatively, the area saving the hibernation information may be a "hibernation file" which is managed by a file system of the OS (operating system). The "hibernation file" is allocated in a user partition on the hard disk as one of files in a same level as a user file.

The partition is fixed once it is partitioned and the partition size can not be changed unless it is partitioned again. On the other hand, in the latter approach, reservation of the saving area may be dynamically changed by the file system of the OS. For example, even when the size of the entire hibernation information is increased as a result of adding a capacity to the main memory, reservation can be managed simply by allocating again the hibernation file by the file system in the latter approach. It is considered that the latter approach is advantageous when considering the possibility of extending the capacity of the memory up to 256 MB from the standard 32 MB memory (the memory size may possibly vary in a wide range) by inserting a SIMM (Single Inline Memory Module) card or a DIMM (Dual Inline Memory Module) card in a predetermined socket of the system board particularly in a recent PC. A method of saving the state of the system in a hibernation file is disclosed, for example, in a Japanese patent application 5-184186 (PUPA 7-84848: Applicant Docket No. JA993020) assigned to the applicant of the present patent application.

In the case of a computer system supporting hibernation/wake-up processing, the system power is shut down by entering the hibernation mode in addition to a normal power off operation (typically by operating a power switch).

The hibernation mode is a state in which the operation is frozen with the system state saved and is clearly distinguished from a power off state. When powering the system on, a normal POR processing runs if the system is in a power off state. Whereas, if the system is in a hibernation mode, a wake up processing which is accompanied with restoration of the saved information has to be executed. Accordingly, in entering the hibernation mode, information indicating that the system is in the hibernation mode (that is, the history that the system is powered off with the state saved) is left in some place in the system. Such information will be hereinafter referred to "hibernation signature". The system, when powered on, can determine which of wake up and POR to be executed depending on whether the hibernation signature has been set or not.

The place where the hibernation signature is stored may be any place to which the system can get an access upon power on. For example, the place may be on a hard disk or in a non volatile memory (NVRAM: for example, a CMOS memory which is backed up by a reserve battery). However, the hibernation signature has to be also saved on a hard disk along with the hibernation information when "remote wake up" is to be executed.

The term "remote wake up" as used here in this specification means that the state of the system is saved in a detachable HDD to enter a hibernation mode on one computer system and then the HDD is detached from the computer system and attached to another computer system to wake up the system*. With "remote wake up", the state of a task immediately before entering the hibernation mode can be restored between a plurality of remote systems only by detaching and exchanging the HDD unit. For example, this would provide a big merit from the view point of TCO (Total Cost of Ownership) for a large scale user (generally, an enterprise) who installs a large number of systems of a same configuration. However, the computer system to which the HDD is attached is unable to know of a hibernation mode unless the hibernation signature is placed on a same hard disk in which the hibernation information is placed. In other words, the computer system is unable to wake up despite the state of the system is exchanged.

By having the hibernation information accompanied with the hibernation signature, the advantage of "remote wake up" is enjoyed. However, there are some points which should be kept in mind in storing the hibernation signature on a hard disk. One of the points is the storage location on the hard disk.

The system has to determine which of a POR processing and a wake up processing should be executed by the system immediately after power on. In other words, a hibernation signature is needed before the OS is loaded in a memory. Therefore, when a hibernation signature is stored on a hard disk, it has to be stored in a place (cylinder) which can be located without using the file system of the OS. For example, in the above cited patent application 5-184186 (PUPA 7-84848), the hibernation signature is to be saved in a predetermined position on the hard disk (more specifically, in a "CE cylinder" defined in the innermost track).

Another point is to avoid the hibernation signature written in a predetermined cylinder of a hard disk from interfering effective data already existing on the same cylinder.

In a system in which the file system of the OS gets an access to the disk** via a BIOS (Basic I/O System), a cylinder for saving the hibernation signature may be reserved by masking it by the BIOS. For example, the innermost cylinder of a hard disk has the largest address value. Therefore, the disk BIOS can hide the CE cylinder from a user access by answering a smaller disk size to an inquiry from the file system of the OS. The OS file system has no way to write user data in the CE cylinder even the existence of which is unknown to the file system so that the user data would never interfere the hibernation signature.

A BIOS is generally provided to an end user by being permanently written in a ROM (Read Only Memory) on the system board by a manufacturer or a seller of a computer system. If a cylinder for a hibernation signature can be reserved by a function of the BIOS, an interference between user data and the hibernation signature can be avoided without having the end user and a software (OS) vendor being aware of it. Also, manufacturers and sellers of a computer system will be able to firmly guarantee a series of operations in hibernation and wake up of the system.

However, there are operating systems which get an access directly to a hard disk without going through the BIOS among recent operating systems (that is, a device driver in the OS issues an I/O command to the disk without calling the BIOS). An example of such OS is "OS/2" (trademark of International Business Machines Corporation) sold by International Business Machines Corporation. The BIOS can not hide any cylinder on the disk for the file system of such OS because the hard disk itself has no way but honestly answer to an I/O command which is an immediate hardware operation and is not provided with an architecture to reserve a specific cylinder.

The file system of an OS of a type which has an immediate access to a hard disk can get an access to a cylinder which the BIOS has masked. In such OS environment, user data may have been possibly written in the cylinder for the hibernation signature. If this is the case, writing a hibernation signature in the specified cylinder would destruct user data originally existing there in entering the hibernation mode. In such case, the system will be able to wake up by having written a hibernation signature. However, any lost user data can not be restored so that the system would malfunction when an application using such user data portion is started.

It is a manufacturer or a seller of a computer system who provides hibernation/wake-up technology. Such manufacturer and seller are generally different from vendors of OS. The morphology and policy of use of a hard disk vary from OS to OS and it is almost impossible to make an agreement as to the place where the hibernation signature is stored between the manufacturers/sellers and vendors of OS.

The reliability of a system is lost with destruction of even a very small portion of user data. The manufacturers and the sellers will not be free from being blamed of failure to assure the operation of the system.

It will be readily understood that the hibernation file is allocated on the disk so as not to interfere with other user data because it is managed by the file system of the OS.

A computer system which wakes up by the remote wake up must have a same system configuration as the computer system which entered the hibernation mode. In other words, the system has a same size of memory and a same kind and number of I/O devices, and the I/O devices have to share a same system resource.

An application and OS can call the BIOS by issuing an INT command. For example, IBM PC/AT compatible machines (PC/AT is a trademark of International Business Machines Corporation) are generally so designed as to call a disk I/O routine in the BIOS using an INT 13 command.

It is an object of this invention to provide an improved information handling system and a method of controlling the same which implements a low power consumption technology in which a task under execution is interrupted upon occurrence of a predetermined event and a state of almost completely stopping the system operation (i.e., low power consumption mode) is entered.

It is another object of this invention to provide an improved information handling system and a method of controlling the same which saves the system state in an external storage device such as a hard disk to shift to a low power consumption mode and returns to the original operation mode by restoring the saved state.

It is a further object of this invention to provide an information handling system which is capable of saving the system state without destructing other user data on the external storage device and a method of controlling the same.

SUMMARY OF THE INVENTION

This invention is conceived in view of the above objectives and, in the first aspect thereof, provides an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising;

(a) means for saving hibernation information including the content of said memory in a hibernation information storing area in said external storage device, (b) a hibernation managing information storing area provided in a fixed place in said external storage device, (c) means for sheltering data existing in said hibernation managing information storing area to said hibernation information storing area in response to occurrence of said predetermined event, (d) means for storing the hibernation managing information in said hibernation managing information storing area after the data has been sheltered by said means (c), and (e) means for stopping electric feeding to parts in the system after said means (a), (c) and (d) have executed their functions.

This invention provides, in the second aspect thereof, an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising;

(a) means for saving hibernation information including the content of said memory in a hibernation information storing area in said external storage device, (b) a hibernation managing information storing area provided in a fixed place in said external storage device, (c) means for sheltering data existing in said hibernation managing information storing area to said hibernation information storing area in response to occurrence of said predetermined event, (d) means for storing the hibernation managing information in said hibernation managing information storing area after the data has been sheltered by said means (c), (e) means for stopping electric feeding to parts in the system to cause the system to shift to the hibernation mode after said means (a), (c) and (d) have executed their functions, (f) means for checking said hibernation managing information stored in said hibernation managing information storing area in response to resumption of feeding power to the system, (g) means for restoring said hibernation information saved in said hibernation information storing area to the original places in response to successful completion of checking by said means (f), and (h) means for returning data sheltered to said hibernation information storing area to said hibernation managing information storing area in response to successful completion of checking by said means (f).

This invention provides, in the third aspect thereof, a method of controlling an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the method comprising the steps of;

(a) saving hibernation information including the content of said memory in a hibernation information storing area in said external storage device, (b) providing a hibernation managing information storing area in a fixed place in said external storage device, (c) sheltering data existing in said hibernation managing information storing area to said hibernation information storing area in response to occurrence of said predetermined event, (d) storing the hibernation managing information in said hibernation managing information storing area after the data has been sheltered by said step (c), and (e) stopping electric feeding to parts in the system after said steps (a), (c) and (d) have been executed.

This invention provides, in the fourth aspect thereof, a method of controlling an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising the steps of;

(a) saving hibernation information including the content of said memory in a hibernation information storing area in said external storage device, (b) providing a hibernation managing information storing area in a fixed place in said external storage device, (c) sheltering data existing in said hibernation managing information storing area to said hibernation information storing area in response to occurrence of said predetermined event, (d) storing the hibernation managing information in said hibernation managing information storing area after the data has been sheltered by said step (c), (e) stopping electric feeding to parts in the system to cause the system to shift to the hibernation mode after said steps (a), (c) and (d) have been executed, (f) checking said hibernation managing information stored in said hibernation managing information storing area in response to resumption of feeding power to the system, (g) restoring said hibernation information saved in said hibernation information storing area to the original places in response to successful completion of checking by said step (f), and (h) returning data sheltered to said hibernation information storing area to said hibernation managing information storing area in response to successful completion of checking by said step (f).

This invention provides, in the fifth aspect thereof, a computer readable storage medium storing in a tangible form a computer program running on a computer system of a type comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the said computer program comprising;

(a) a routine for saving hibernation information including the content of said memory in a hibernation information storing area in said external storage device, (b) a routine for providing a hibernation managing information storing area in a fixed place in said external storage device, (c) a routine for sheltering data existing in said hibernation managing information storing area to said hibernation information storing area in response to occurrence of said predetermined event, (d) a routine for storing the hibernation managing information in said hibernation managing information storing area after the data has been sheltered by said routine (c), and (e) a routine for stopping electric feeding to parts in the system after said routines (a), (c) and (d) have been executed.

This invention provides, in the sixth aspect thereof, a computer readable storage medium storing in a tangible form a computer program running on a computer system of a type comprising a CPU, a volatile memory and a nonvolatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the said computer program comprising;

(a) a routine for saving hibernation information including the content of said memory in a hibernation information storing area in said external storage device, (b) a routine for providing a hibernation managing information storing area in a fixed place in said external storage device, (c) a routine for sheltering data existing in said hibernation managing information storing area to said hibernation information storing area in response to occurrence of said predetermined event, (d) a routine for storing the hibernation managing information in said hibernation managing information storing area after the data has been sheltered by said routine (c), and (e) a routine for stopping electric feeding to parts in the system after said routines (a), (c) and (d) have been executed.

(f) a routine for checking said hibernation managing information stored in said hibernation managing information storing area in response to resumption of feeding power to the system, (g) a routine for restoring said hibernation information saved in said hibernation information storing area to the original places in response to successful completion of checking by said routine (f), and (h) a routine for returning data sheltered to said hibernation information storing area to said hibernation managing information storing area in response to successful completion of checking by said routine (f).

The non volatile external storage device may be a hard disk drive, for example. A hard disk drive is typically installed in almost all computer systems.

The term "hibernation managing information" as used here in this specification may include a hibernation signature indicating a history in which an information system stopped feeding by a hibernation function as well as positional information of a hibernation information storing area on a hard disk and system configuration information of the information handling system.

The hibernation signature is used for determining whether or not the system was in a hibernation mode when power feeding is resumed.

The allocation information is used for quickly searching a location of data which was saved in the hibernation information storing area.

The system configuration information is collated to the system configuration information of the information handling system which is now executing wake up. When remote wake up is executed, there is a possibility where the system configuration information of the information handling system which is now executing wake up is different from the system configuration at the time when the hibernation mode was entered. It is important to check the system configuration because the system may subject to an unexpected damage such as a system hang up if the task dares to be resumed under a different system environment.

It is desirable that the hibernation managing information storing area is in a physically fixed position on a hard disk. For example, if it is allocated in a cylinder defined in the outermost or innermost area of the hard disk, it is easy to assure and search the area.

The outermost cylinder generally contains a sector (boot sector) for recording information describing partition information (start address and size of partitions) of a hard disk. Thus, the outermost cylinder is mostly reserved so as to prevent the user from getting an access.

The information handling system of this invention is a general purpose personal computer which is provided with a volatile memory and a non volatile external storage device. The system supports a so called hibernation function which allows the system to be restored to a same original state when it is powered on by saving the state of the system before the power is switched off.

A particularly unique feature of this invention is a mechanism of storing hibernation managing information.

When a predetermined event implying a shift to a hibernation mode (a low battery condition, for example) occurs, the system responds to this to save the hibernation information in a hibernation information storing area provided on a hard disk. The hibernation information includes volatile data such as the content of a memory and a VRAM, for example.

A hibernation managing information storing area is provided in a fixed location on the hard disk. For example, a cylinder defined in the outermost or innermost area (or a specific sector within the cylinder) of the hard disk is designated as a hibernation managing information storing area.

A boot sector which is very important data to the system already exists in the outermost cylinder. Thus, the hibernation managing information is written into the outermost cylinder after sheltering the boot sector into the hibernation information storing area. Also, because there is a possibility where user data has been written in the innermost cylinder, it is necessary to shelter the data existing in the cylinder (or a specific sector in the cylinder) to the hibernation information storing area when the innermost cylinder is used as a hibernation managing information storing area.

The system stops feeding to parts in the system and shifts to the hibernation mode after such series of data saving processes have been completed.

On the other hand, when power feeding to the system is resumed, the hibernation managing information stored in the hibernation managing information storing area is read out to check to see whether or not the system was in the hibernation mode or it is provided with a system configuration to enable the system to wake up.

The hibernation information saved in the hibernation information storing area is then restored to the original places. When a data location is searched in the hibernation information storing area, the allocation information saved as a part of the hibernation managing information may be used.

The boot sector or user data which has been sheltered to the hibernation information storing area is also written back to the original outermost or innermost cylinder (or a specific sector in the cylinder). As a result, the hard disk is restored to a condition to boot.

The steps of operation to save the hibernation managing information on the hard disk is now described with reference to FIG. 5 which consists of figures (a) to (d), the rectangle of each figure schematically representing the address space of the hard disk.

The hibernation information storing area is a "hibernation file" which is controlled by the OS file system, for example. The hibernation file is allocated as a file in a same level as user file in the user partition on the hard disk. For example, the hibernation file is created on the hard disk by using a file creating utility program (normally, an executable program in a EXE file form).

Figure 5:
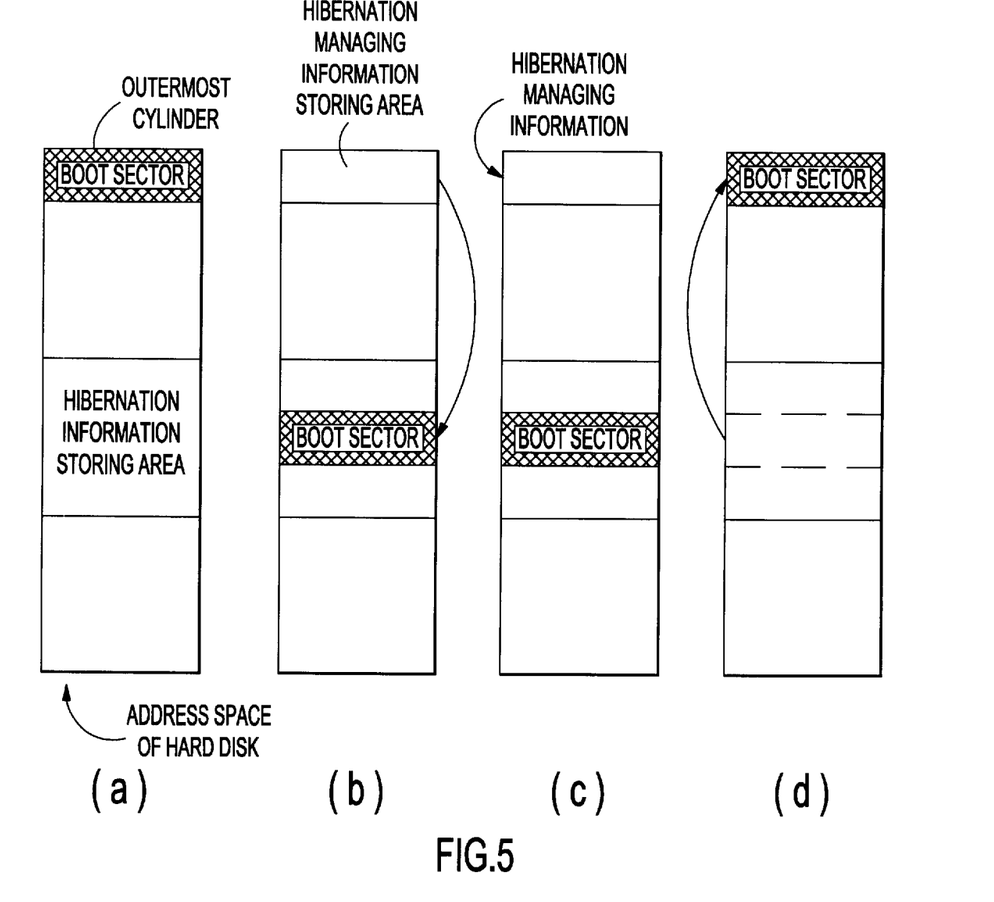
FIG. 5 is a schematic diagram showing operational steps of storing hibernation managing information on a hard disk.

The hibernation information storing area is shown as if it is a bulk of block comprising consecutive addresses in FIG. 5 for the convenience of explanation. However, the area may be scattered into clusters of discrete addresses chained by a file allocation information such as FAT (File Allocation Table) so long as the file is a "hibernation file".

At the time when an event for entering a hibernation occurs, a boot sector is written in the outermost cylinder as shown in FIG. 5(a). By sheltering the content of the boot sector to the hibernation information storing area as shown in FIG. 5(b), the outermost cylinder (or a specific sector in the cylinder) is made available as the hibernation managing information storing area.

The hibernation managing information may be then saved in the outermost cylinder (or a specific sector in the cylinder) as shown in FIG. 5(c). In waking up from a hibernation mode, the hard disk becomes in a condition to boot by writing the content of the sheltered boot sector back to the outermost cylinder after the hibernation managing information has been used (refer to FIG. 5 (d)).

While the hibernation information storing area is shown in FIG. 5 without overlapping the hibernation managing information storing area, these areas may be incidentally allocated to a same physical address of the hard disk. This is because the physical address of the hibernation managing information storing area fixed while the hibernation information storing area is allocated entirely independently of the physical address using a utility program. Nevertheless, there is no problem of the operation in such occasion because the data originally existing in the hibernation managing information storing area has been sheltered.

It should be fully understood that none of user data is destructed in saving the hibernation managing information on the hard disk according to this invention.

The manufacturers and the sellers of a computer system will thus be able to firmly guarantee a series of operations in hibernation and wake up.

The computer readable storage medium of the fifth and sixth aspects of this invention define a structural and functional cooperative relationship between a computer program and the storage medium to implement the function of the computer program on a computer system. In other words, by mounting the computer readable storage medium on a computer system (or installing a computer program in a computer system), a cooperative action is realized to provide an operation and an effect which are similar to the first to fourth aspects of this invention.

An example of the computer readable storage medium is a ROM (read only memory) implemented on a system board of a computer. If the ROM is of a type which is rewritable after erasure (e.g., EEPROM, Electrically Erasable Programmable Read Only Memory), the computer readable storage medium in the context of this specification include an exchangeable storage medium which is inserted in an external storage device unit (e.g., a diskette loaded in a floppy disk drive unit) to update the content of the ROM. When a computer program to be written into the ROM is down loaded via a wide area network such as the internet, a remote disk which is placed under the control of a server (Web server) on the network is included in the computer readable storage medium as used here in this specification.

Further objects, features and advantages will be apparent from the detailed description referring to the embodiment of this invention and accompanying drawings.

DETAILED DESCRIPTION OF THE INVENTION

An embodiment of this invention is described in detail hereunder with reference to the drawings.

A. Hardware Configuration of Computer System

Figure 1:
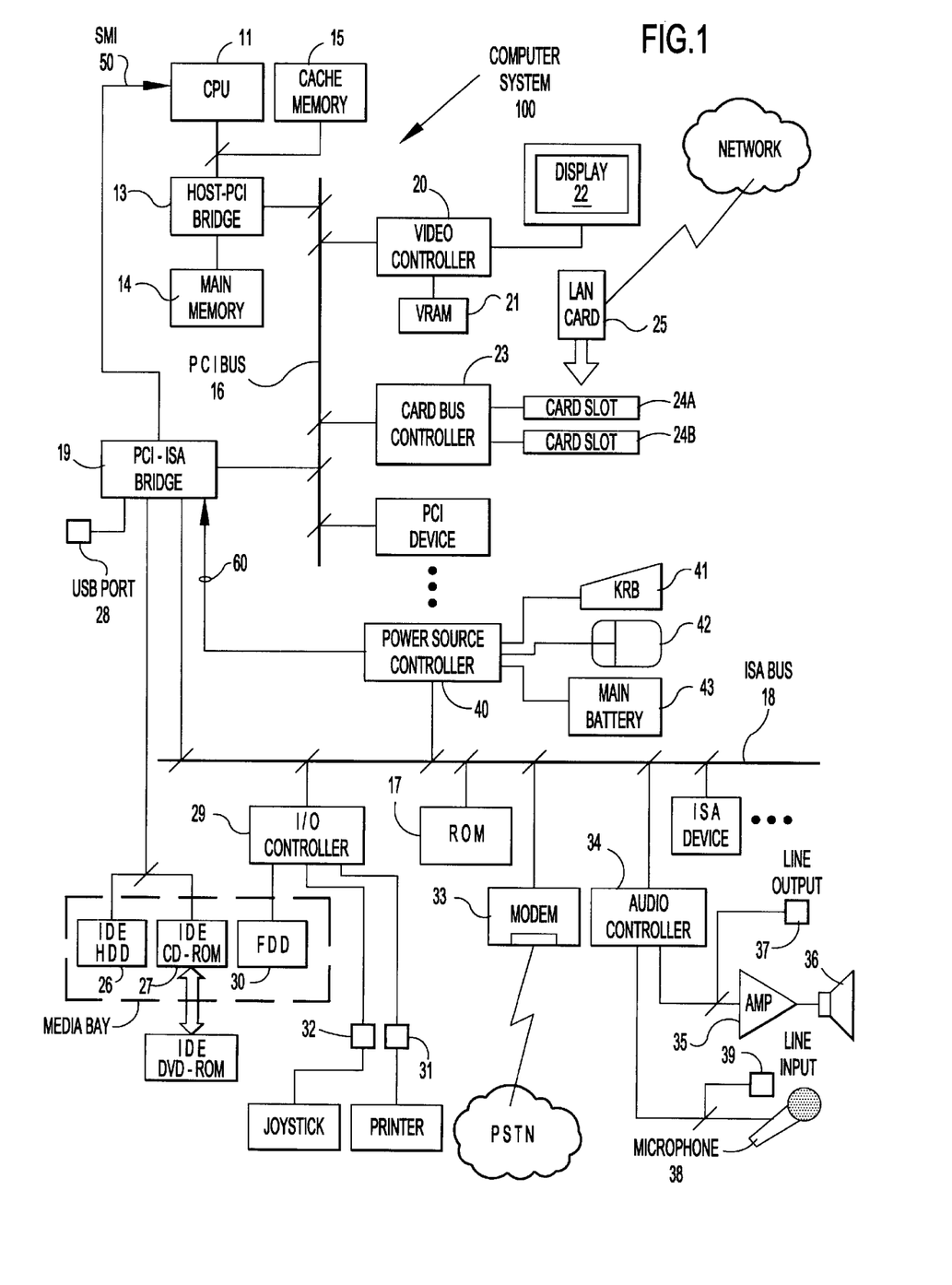
FIG. 1 is a schematic diagram of a hardware configuration of a personal computer (PC) 100 which is suitable for implementing this invention.

FIG. 1 schematically shows a hardware configuration of a typical personal computer (PC) 100 in which this invention is suitably implemented. An example of the computer system 100 implementing this invention conforms to OADG (PC Open Architecture Developer's Group) specification and is loaded with "Windows95" of Microsoft Corporation or "OS/2" of International Business Machines Corporation as an operating system (OS). Each part will be described hereunder.

A CPU 11 which is a main controller executes programs under the control of the OS. The CPU 11 may be the CPU chip "Pentium" or "MMX Technology Pentium" made by Intel Corporation.

The CPU 11 supports SMM (System Management Mode) operation mode. This type of CPU 11 is provided with a memory area which is accessed only in the SMM mode (hereinafter tentatively called "SMM memory") in the main memory 14 (to be described later). When an SMI (System Management Interrupt) interruption using an SMI signal line 50 takes place, the CPU 11 shifts to a SMM operation mode to access to the SMM memory and executes a predetermined SMM processing according to the program code stored therein.

In this embodiment, an SMM mode is used for the hibernation and wake up functions. Specifically, the mechanism is such that a power management code (hereinafter called "PMC") describing a series of operation steps relating to hibernation/wake-up is loaded in the SMM memory, and occurrence of SMI interruption causes the process of the CPU 11 to jump to the PMC to cause the system 100 to enter the hibernation mode. The advantage of using the SMM operation mode lies in that the hibernation function is implemented without the need to rewrite an existing application software.

The CPU 11 is interconnected to I/O devices to be described later via a 3 layered bus comprising a processor bus 12 connected to the external pins of the CPU 11, a PCI (Peripheral Component Interconnect) bus 16 which is a local bus and an ISA (Industry Standard Architecture) bus 18 which is a system bus.

The processor bus 12 and the PCI bus 16 are interconnected by a bridge circuit (host-PCI bridge) 13. The bridge circuit of the present embodiment comprises a memory controller for controlling an access operation to the main memory 14 and data buffers which absorbs the difference of data transfer rates between the buses 12 and 16.

The main memory 14 is a writable memory and is used to load a program code of the CPU 11 including a device driver, an OS and an application program and temporarily store work data during execution of such program code. In the present embodiment, a predetermined area of the main memory 14 is allocated as an SMM memory which is accessible only in the SMM operation mode and the PMC (described in the above) is loaded there. The PMC is permanently stored in a ROM 17 (to be described later)

along with the BIOS, etc., and loaded in the main memory 14 upon POR (Power on Reset).

The main memory 14 generally comprises a plurality of DRAM (dynamic RAM) chips and the system 100 is provided with 32 MB as a standard with expandability up to 512 MB.

An L2-cache memory 15 is a high speed memory which absorbs the time during which the CPU 11 accesses to the main memory 14. Limited codes and data which are frequently accessed by the CPU 11 are temporarily stored in the L1-cache memory 15. The L2-cache memory 15 generally comprises SRAM (static RAM) chips and has 512 KB of memory capacity, for example.

The PCI bus 16 is a bus of a type which allows a relatively high speed data transfer (32/64 bits bus width, 33/66 MHz maximum operating frequency, and 132/264 MBps maximum data transfer rate) and PCI devices driving in a relatively high speed such as a video controller 20 and a card bus controller 23 are connected to the PCI bus 16. The PCI architecture was originally proposed by Intel Corporation and implements a so called PnP (plug and Play) function.

The video controller 20 which is a controller dedicated to actually process a rendering instruction from the CPU 11 writes processed rendering information temporarily in a screen buffer (VRAM) 21 and reads out the rendering information from the VRAM 21 to output it to a display 22 as rendering data. The video controller 20 supports a bit map display format and is compatible to a resolution corresponding to XGA (Extended Graphic Array) or SVGA (Super Video Graphic Array), for example. When the system 100 is a portable type equipment, a liquid crystal display (LCD) is typically used as the display 22. The display content of the LCD is illuminated by a back light (not shown) disposed in the back side. The LCD is advantageous over a CRT (Cathode Ray Tube) display in that it is thin, light and of a relatively low power consumption.

The card bus controller 23 is a controller dedicated to have a bus signal of the PCI bus connected to the card bus and provided with 2 PC card slots 24A and 24B into which a PC card 25 which conforms to the specification (PC Card Standard 95, for example) ruled out by PCMCIA (Personal Computer Memory Card International Association)/JEIDA (Japan Electronic Industry Development Association) may be inserted. There are a line up of a LAN card for network connection, an HDD installed card and a SCSI (Small Computer System Interface) card for external connection of SCSI equipment as the PC card 25. By inserting a LAN card, the computer system 100 is connected to a LAN such as Ethernet and a token ring and further gateway connected to the internet via a router (not shown) to allow the WWW (World Wide Web) to be utilized as a wide area information retrieval system (well known). An updated ROM code may be down loaded from a Web server on the internet, for example.

The PCI bus 16 and the ISA bus 18 are interconnected by a bridge circuit (PCI-ISA bridge) 19. The bridge circuit 19 comprises a DMA controller, a programmable interruption controller (PIC), a programmable interval timer (PIT), an RTC (Real Time Clock)/CMOS and a trap logic.

The DMA controller is a controller dedicated to execute data transfer between an I/O device and the main memory 14 without intermediation of the CPU 11.

The PIC processes an interruption request (IRQ) from an I/O device and notifies the CPU 11 of the IRQ. The CPU 11, upon receiving the notification of an interruption, interrupts the task under execution and executes a predetermined processing program (interruption handler).

The PIT is a device for generating a timer signal (normally a rectangular wave) in a predetermined period which is programmable.

The RTC portion of the RTC/CMOS measures the current time. The CMOS portion is used for saving information indispensable to a safety and a security od the system 100 such as system configuration information (set up value of the BIOS) and a power on password. The RTC/CMOS is backed up by a reserve battery (normally a coin battery) so that the CPU 100 does not lose its measured content and stored content during power off state. It is technically feasible to store the hibernation managing information in the CMOS memory but this is not done in the present embodiment.

The trap logic receives a control signal line 60 from a power source controller 40 (to be described later) via one of the general purpose external input terminals and outputs an SMI signal line 50 which is connected to an SMI pin of the CPU 11. The trap logic mainly has 2 functions. One of the functions is to assert the SMI signal line 50 in response to assertion of the control signal line 60 for generating an SMI interruption. The other function is to continuously monitor the buses 16 and the bus 18 and assert the SMI signal line 50 when the address (I/O address or memory address) set in an internal register is detected for generating an SMI interruption. However, the latter function is irrelevant to implementation of this invention.

The bridge circuit 19 of the present embodiment is further provided with an IDE interface for connecting an external storage device conforming to IDE (Integrated Drive Electronics). An IDE hard disk drive (HDD) 26 is connected to this IDE interface and an IDE CD-ROM drive 27 is ATA (AT Attachment Packet Interface) connected to the same. These IDE devices may be detachable or exchangeable. Another type of IDE device such as a DVD (Digital Video Disc or Digital Versatile Disc) drive may be connected alternatively to the IDE CD-ROM drive 27. The external storage devices such as the HDD 26 and the CD-ROM 27 are contained in a receptacle place called "media bay" or "device bay" along with an FDD 30 (to be described later).

The HDD 26 is an external storage device fixedly mounting a disk as a storage medium (well known) and advantageous over other external storage devices in terms of the data transfer rate. Software programs (e.g., OS, device driver and applications) copied on the disk of the HDD 26 are ready (i.e., installed) for use by the system 100. The hibernation information storing area for storing the hibernation information is assured on the hard disk upon POR of the system 100, for example. The area may be assured as a "hibernation file", i.e., in a file format conforming to the OS file system. The hibernation file is allocated in a user partition on the hard disk as a single file in a same level as a user file. For example, a hibernation file may be created on the hard disk using a file creating utility program (normally, an executable program in an EXE file format).

CD-ROM drive 27 is an external storage device for mounting a compact disk (CD) as a storage medium and is used for installing a software program stored in a CD (CD-ROM) in the system 100 and playing back a music CD (CD-DA data). This is all well known.

The bridge circuit 19 of this invention has a USB controller installed therein for connecting a USB (Universal Serial Bus) which is a general purpose bus and is provided with at least one USB port 28. USB supports the "Hot Plugging" function for allowing a USB device to be plugged and unplugged while its power is turned on, in addition to the "Plug and Play" function for automatically recognizing an added or removed USB device and for changing setting of the system configuration information. To a single USB port 28, a maximum of 63 USB devices can be connected in a daisy chain fashion. Examples of USB devices are a keyboard, a mouse, a joystick, a printer, a modem, a display and a tablet (all not shown).

The ISA bus 18 has a slower data transfer rate than the PCI bus 16 (bus width: 16 bits, maximum data transfer rate: 4 Mbps) and, thus, it is used for connecting ISA devices such as an I/O controller 29, a modem 33, an audio controller 34 and a power source controller 40 as well as devices driven st a relatively slow speed such as a ROM 17.

The I/O controller 29 is a peripheral controller for controlling operations of the floppy disk drive (FDD) 30, I/O operations of parallel data (PIO) via a parallel port 31, and I/O operations of serial data (SIO) via a serial port 32. A printer may be connected to the parallel port 31, while a joystick may be connected to the serial port 32.

The FDD 30 is an external storage device for exchangeably mounting a floppy disk (FD) as a storage medium. This is well known. The FDD 30 is primarily used for installing a software program supplied in the form of an FD in the system 100 and saving work data in an FD. For example, an updated ROM code is supplied to the system 100 by the mediation of an FD.

The modem 33 is a device for transmitting digital computer data via an analog public switched telephone network (PSTN). The computer system 100 may be connected to a remote computer system via the modem 33. For example, by dialling up to an access point provided by a service provider, the computer system 100 is IP connected to the internet to make utilization of WWW (World Wide Web) as a wide area information retrieval system available as is well known. An updated ROM code, for example, may be down loaded from a Web server on the internet.

The audio controller 34 is a controller dedicated for input/output of an audio signal and includes a CODEC (COder-DECoder: i.e., an AD/DA converter with a mixing function) for recording and playing back the audio signal. The audio signal is outputted by an internal speaker 36 after it is amplified by an audio amplifier 35 or supplied to an external audio equipment (not shown) via a line output terminal 37. The audio signal is inputted from a voice input from an internal microphone 38 or from a line input 39 from an external audio equipment (not shown).

The power source controller 40 is provided for managing a feeding subsystem in the computer system 100. The power source controller 40 is preferably the 1 chip controller IC "330/H8" made by Hitachi Corporation. This IC is provided with a 16 bit processor as well as a RAM, a ROM, 8 analog input pins and 16 digital input/output pins and the operation thereof is programmable. The power source controller 40 of the present embodiment is also provided with a function to control input/output of the keyboard 41 and a pointing device (mouse) 42 and operates as follows:

(1) generates a scan code corresponding to the input key on the keyboard 41 and a coordinate value pointed by the pointing device 42, (2) detects residual capacity and start/stop time of charge/discharge operations of a main battery 43 by monitoring the terminal voltage, charge/discharge current value and an ambient temperature of the battery 43, (3) asserts the control signal line 60 in response to occurrence of a predetermined event (where the predetermined event is an event which implies a shift to the hibernation mode, such as elapse of a predetermined time after the latest key/mouse input, depression of a hot key and falling into a low battery condition, etc.

Figure 2:
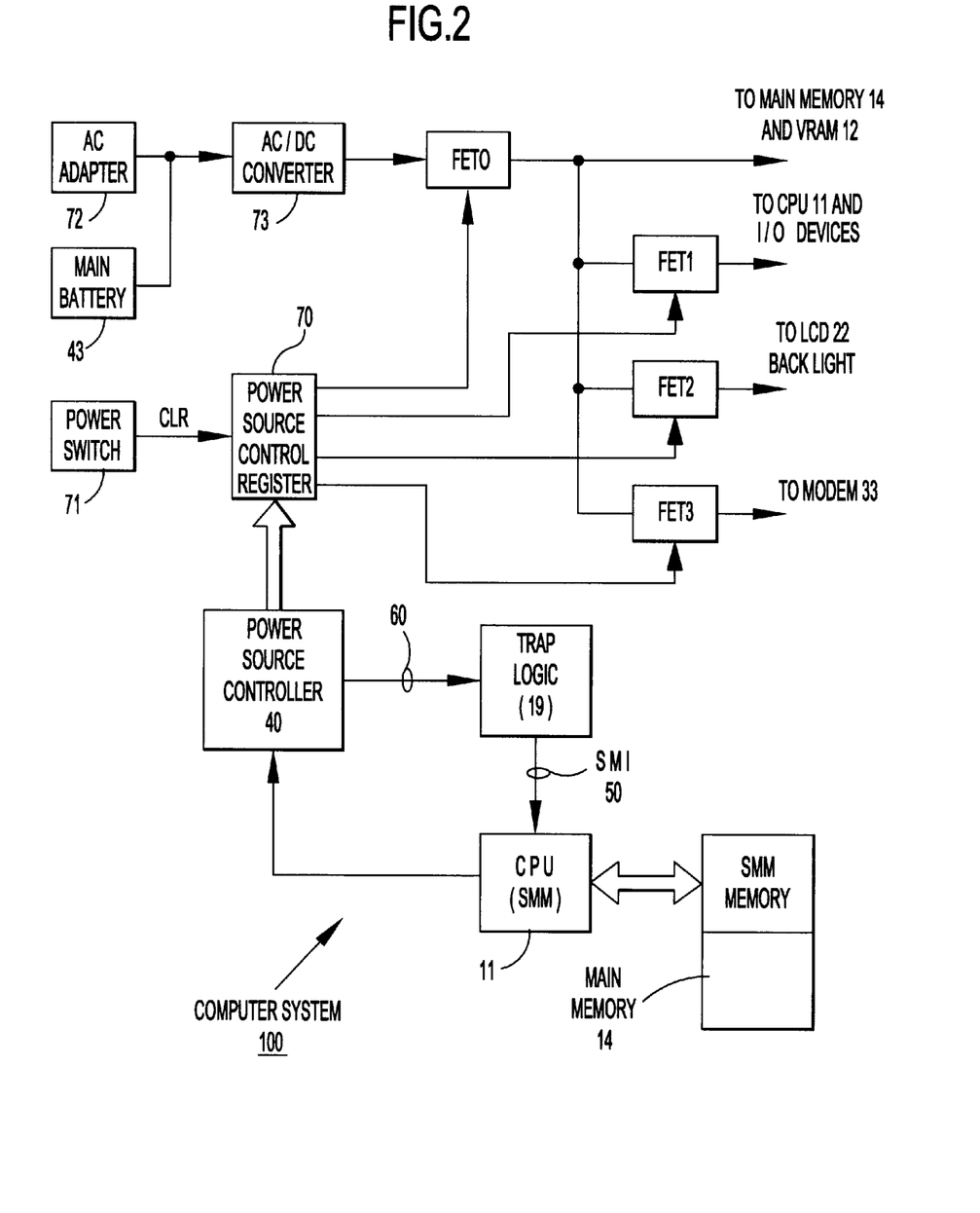
FIG. 2 schematically shows a feeding subsystem for implementing power-on off operations in the computer system 100 shown in FIG. 1.

(4) switches the power of individual device or the entire system 100 off according to a command from the CPU 11 (the power off operation is performed by a cooperative action with a power source control register 70 (not shown in FIG. 1. Refer to FIG. 2) as described in detail later).

The ROM 17 is a non volatile memory for permanently storing a predetermined code and data. Stored in the ROM 17 are; an IPL (Initial Program Loader) for loading a program in a memory upon starting, a POST (Power On Self Test) executed upon power on, codes (BIOS) for controlling input/output of I/O devices such as the keyboard 41 and the FDD 30, and a power management code (PMC) describing a series of processes (to be described later) relating to hibernation/wake up. The BIOS and PMC in the ROM 17 are loaded in the main memory 14 by the POST upon POR of the system 100 (provided that the PMC is loaded in the SMM memory area as described previously).

If the ROM 17 is of a type which is rewritable after erasure (EEPROM; Electrically Erasable Programmable Read Only Memory, for example), ROM code such as BIOS and PMC may be updated by rewriting after shipment of the product. The updated version of ROM codes are distributed by storing in an FD or from a predetermined Web server (normally, a home page of the manufacturer and seller of the computer system 100) via the internet.

A typical user of a personal computer 100 operates the system 100 via the keyboard 41 or the mouse 42 to execute applications such as word processing, spread sheet, communication and Web browser for helping the user perform its job on the display screen (i.e., desk top). Personal computers currently sold in the market would demonstrate a sufficient performance as the computer system 100 shown in FIG. 1.

In order to configure the computer system 100, many other electrical circuits are required beside those shown in FIG. 1. However, they are omitted in this specification because they are well known in the art and does not constitute the gist of this invention. It should be also understood that only a part of connections among the devices of FIG. 1 are shown in the figure to avoid unnecessary complication of the figure.

B. Power Feeding Subsystem in the Computer System

FIG. 2 schematically shows a power feeding subsystem for implementing power on/off operations in the computer system 100 shown in FIG. 1. FIG. 2 is now described below.

The computer system 100 of the present embodiment is driven using a commercial AC power source and a main battery 43 as a primary power source. The commercial AC source voltage is converted to a DC voltage by an AC adapter 72 and then inputted to a DC/DC converter 73 along with the output voltage of the main battery 43 in parallel.

The DC/DC converter 73 is a circuit for converting the voltage supplied from the above primary power source to a level suitable for driving the devices in the system 100 to provide a stabilized output. The source voltage outputted by the DC/DC converter 73 is distributed to various parts via a switch FET0. The main memory 14 and the VRAM are fed via only the switch FET0. The CPU 11 and the I/O devices are fed through 2 switches FET0 and FET1. The LCD 22 and the back light thereof are fed through 2 switches FET0 and FET2. The modem 33 is fed through 2 switches FET0 and FET3.

Each gate terminal of the FET switch is electrically connected to a corresponding bit cell in the power source control register 70. Therefore, the power source controller 40 is able to power the portions in the system 100 on and off by setting a predetermined register value in the power source control register 70. For example, LCD off mode is implemented by setting only FET2 off. By setting FET1, FET2 and FET3 off, the system 100 falls in a halted state (suspend mode) in which only the memories 14 and 21 are backed up. By setting FET0 off, the entire system 100 is powered off.

A power switch 71 (generally disposed in the wall of the body of a computer) is electrically connected to a clear terminal of the power source control register 70. The register values are reset in the power source control register 70 to switch all the FET switches on by a signal generated when the user operates the power switch 71 to power on so that the entire system 100 will be fed.

As described already, the power source controller 40 asserts the control signal line 60 when it detects occurrence of a predetermined event. The trap logic in the bridge circuit 19 asserts the SMI signal 50 in response to assertion of the control signal line 60 and generates an SMI interruption to the CPU 11. The CPU 11 interrupts the task under execution and enters an SMM operation mode in which the CPU 11 executes a process for entering the PMC in the SMM memory, i.e., the hibernation mode. When execution of PMC has been completed, the CPU 11 sends a command to the power source controller 40 to have it power off the entire system 100.

C. Processing Steps for Hibernation/Wake Up

The hardware configuration of the computer system 100 implementing this invention have been described in the above paragraphs. In this section, a process in which the system 100 enters a hibernation mode and a process in which the system 100 wakes up from the hibernation mode will be described in detail.

While a series of processes for hibernation/wake up may be implemented as an interruption processing routine, it is implemented in this embodiment by using an SMI interruption described previously. In other words, it is done by the CPU 11 executing the power management code (PMC) loaded in the SMM memory. It will be readily understood that the processing steps may be modified by updating the PMC in the ROM 17.

Figure 3:
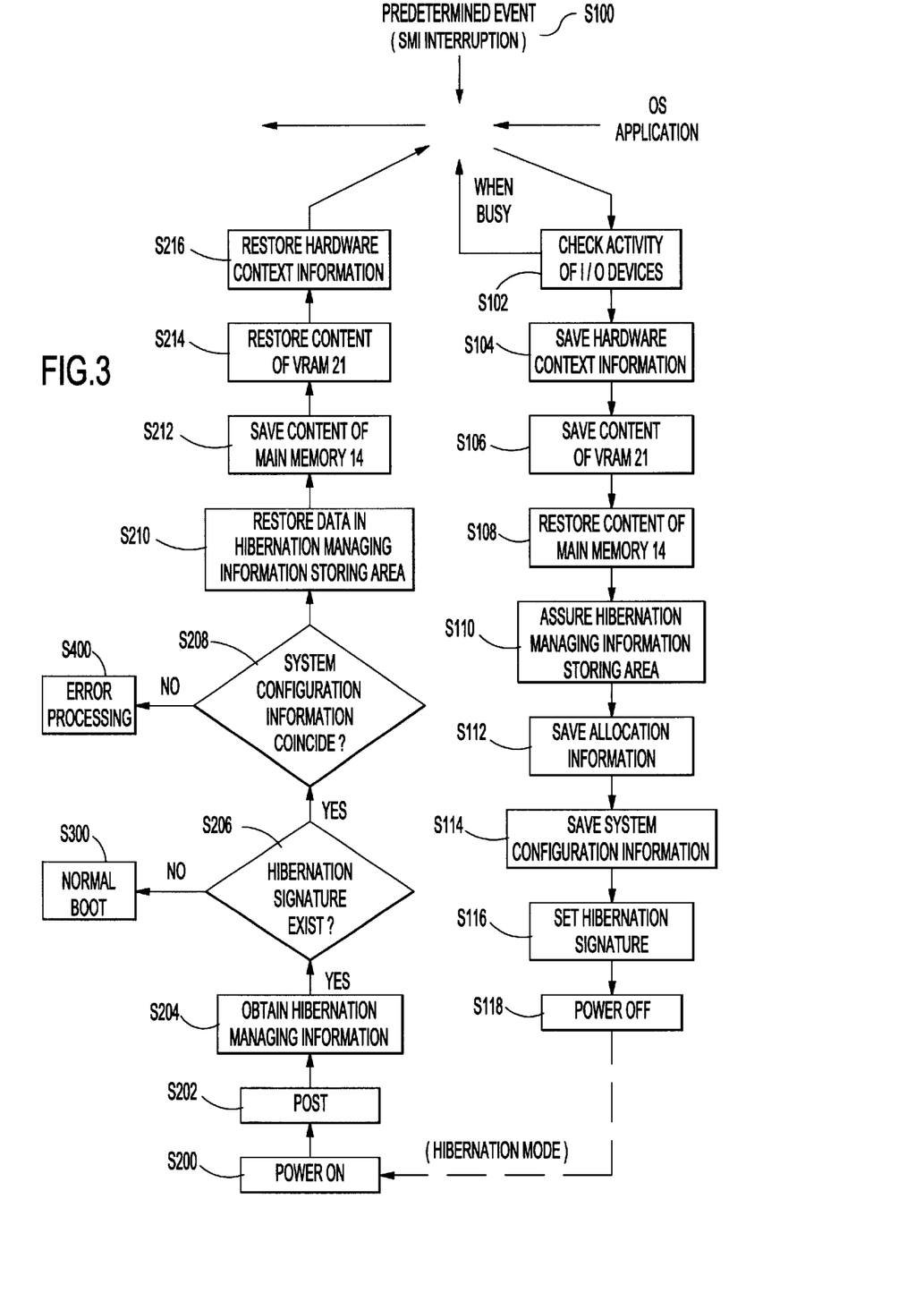
FIG. 3 is a flow chart showing a general processing steps for hibernation/wake-up.

FIG. 3 shows a flow chart describing the processing steps for hibernation/wake up. The flow chart is now described hereunder,

Shift to Hibernation Mode

When a predetermined event occurs in the system, the CPU 11 is SMI interrupted (S100). As a result, the control of the system 100 moves to the PMC in the SMM memory from the OS and application. The term "event" as used here means that a predetermined length of time has elapsed from the latest key/mouse input, a hot key is depressed, or the system falls in a low battery condition, etc.

First of all, the PMC checks the presence or absence of an activity of each I/O device (step S102). When an activity exists (when DMA transfer is active, for example), checking activity is repeated each time a predetermined length of time has elapsed (10 ms, for example) until the activity ceases.

When the activity of I/O device is no longer detected, the PMC then saves hardware context information and work data in the hibernation information storing area (step S104).

The hibernation information storing area is provided beforehand on the hard disk, for example, upon POR of the system 100 and it may be in a file format (i.e., "hibernation file"). The term "hardware context information" as used here includes a register value and a timer count value of controller chips such as CPU 11, PIC, DMA controller and video controller 20. The hardware context information is important data which defines the current status of the system 100 and constitutes a part of the hibernation information.

The PMC then saves the original data of the VRAM 21 in the hibernation information storing area on the hard disk (step S106). The original data of the main memory 14 is also saved in the hibernation information storing area of the hard disk (step S108). Because the contents of the memories 14 and 21 are volatile and can not be recovered once they are lost, they are saved as a part of hibernation information. Incidentally, the order of saving the contents of the VRAM 21 and the main memory 14 may be reversed.

The hibernation managing information storing area for storing the hibernation managing information storing area is then assured on the hard disk (step S110).

The hibernation managing information storing area is preferably in a physically fixed position on the hard disk (a specific cylinder or a specific sector in a specific cylinder). If it is allocated in a fixed address like a cylinder (or a specific sector in the cylinder) defined in the outermost or innermost area of the hard disk, it is easy to assure the area and search the area at the time of wake up. However, there is a possibility where a boot sector has been written in the outermost cylinder and user data has been written in the innermost cylinder. The step S110 allows the outermost or innermost cylinder (or a specific sector in a cylinder) to be available as a hibernation managing information storing area by sheltering the existing boot sector and user data to the hibernation information storing area. The data to be sheltered may be a specific sector used in the cylinder rather than the entire cylinder.

The hibernation managing information includes a hibernation signature indicating that the system 100 is in the hibernation mode, system configuration information in the system 100 and allocation information of data in the hibernation information storing area. The hibernation managing information is required at a relatively early stage of the wake up processing (to be described later). Accordingly, the hibernation managing information is saved in a fixed address on the hard disk for the convenience of accessing.

The PMC then saves the allocation information of data (start address of data) in the hibernation information storing area in the hibernation managing information storing area (step S112).

The PMC then saves the system configuration information stored in a CMOS memory in the bridge circuit 19 in the hibernation managing information storing area (step S114). The term "system configuration information" as used here includes the number and the kind of the I/O devices connected to the system 100, the size of the main memory 14, and the status of allocating system resources (IRQ level, I/O address and memory address, etc.).

The PMC then sets a hibernation signature in the hibernation managing information storing area (step S116).

After having completed these processes, the PMC sends a command to the power source controller 40 to switch the power of the entire system 100 off (step S118). As a result the system 100 will have fallen to a hibernation mode.

At this point of time, all information required for the system 100 to wake up have been saved on the hard disk. If the HDD 26 is detachable or exchangeable, the task may be resumed in a remote place (i.e., "remote wake up") by detaching the HDD and mounting it on another system.

Wake up from Hibernation Mode

When the user operates the power switch 71, power is fed again to the entire system 100 (step S200).

In response to power on, the CPU 11 executes POST which is stored in the ROM 17 (step S202). POST includes a test of the CPU 11, a test of the main memory 14, a setting up and a test of the display 22, and a test of I/O devices. Also, if a memory is added or removed, or the number of I/O devices is changed during power off, POST rewrites the system configuration information which is saved in the CMOS memory in the bridge circuit 19 (or indirectly rewritten using a predetermined set up program). POST also loads BIOS and PMC from the ROM 17 to the main memory 14, provided that the PMC is loaded in the SMM memory area as described previously.

In the final stage of execution of POST, the hibernation managing information storing area which is defined in the outermost or the innermost cylinder (or a specific sector of the cylinder) of the hard disk is accessed to obtain hibernation managing information (step S204).

It is then determined whether or not the hibernation signature is set in the hibernation managing information (step S206). If the hibernation signature is not set, it is meant that the system has been simply in a power off state rather than a hibernation mode. In this case, a normal boot process is entered without the control of the system 100 being moved to the PMC (step S300).

On the other hand, if the hibernation signature is set, it is meant that power on at step S200 is a wake up rather than POR. In this case, the control of the system 100 is moved to the PMC.

The PMC first compares the system configuration information included in the hibernation managing information with the system configuration information which is written in the CMOS memory in the bridge circuit 19 (step S208).

When a remote wake up is effected by the HDD 26 of removable type in which the hibernation information is saved, a variation of the system configuration may possibly exist, that is, the system configuration at the time when the hibernation mode is entered may be different from the system environment at the time of wake up (the second environment). For example, the size of the main memory 14 may be smaller in the second environment. Also, an application which requires that the base address of an I/O device is a specific value in the first environment while the I/O device in the second environment may use another address. Further, an application accessing to a floppy disk was run in the first environment while the second environment may be provided with no FDD. Such inconsistency of system configurations may invite an inexpedience of destruction of data by a resumed task in addition to inability of wake up processing. By such reason, checking the system configuration at step S208 involves a technically important meaning.

When the result of comparison in the determination block S208 fails, an error processing is effected (step S400). The content of the error processing per se is not directly relevant to this invention. For example, the error processing displays an error message on the display 22 to prompt the user to do a predetermined work. The predetermined work includes disabling the hibernation signature and recovery of the original system configuration to restart the system 100, for example. When it is prompted to recover the system configuration, the original system configuration may be presented on the display 22 to guide the user.

On the other hand, when the system configurations coincide, the boot sector which was sheltered to the hibernation information storing area for saving the hibernation managing information, or user data in the innermost cylinder is restored to the original cylinder/sector (step S210).

The PMC then restores the original data of the main memory 14 which was saved in the hibernation information storing area on the hard disk (step S212).

The PMC then restores the original data of the VRAM 21 which was saved in the hibernation information storing area on the hard disk (step S214). The order of restoring the contents of the VRAM 21 and the main memory 14 may be reversed.

The PMC then restores hardware context information and work data which were saved in the hibernation information storing area on the hard disk to the original place (step S216).

The restoration processes in the steps S212, S214 and S216 are performed using the allocation information which was saved at the step S112 as a part of the hibernation managing information. As a result, the PMC is able to promptly access to the data in the hibernation information storing area.

After the above processes have been executed, the control of the system 100 is returned to the OS or the application again to resume the task from the point of interruption.

Figure 4:
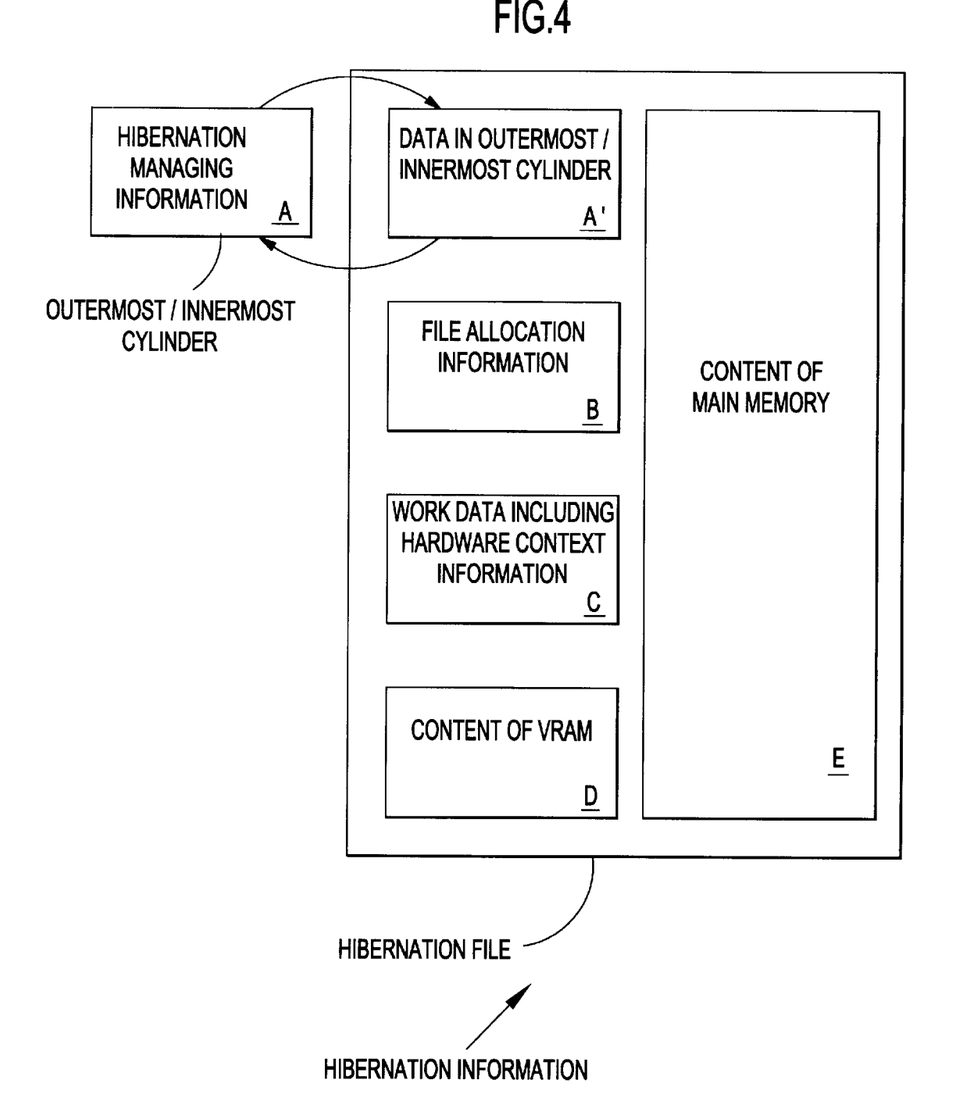
FIG. 4 is a diagram showing the structure of data which is saved/restored in shift to the hibernation mode.

FIG. 4 shows a data structure which is saved and restored in the disk in shifting to the hibernation mode. This will be now described hereunder.

The hibernation information includes hibernation managing information A, file location information in a hibernation file (FAT) B, hardware context information (including work data) C, the content of the VRAM 21 D, and the content of the main memory 14 E. Among them, B to E are saved in the hibernation information storing area provided on the hard disk while A is saved in the hibernation managing information storing area separately.

The hibernation information storing area is a "hibernation file" which is managed by the OS file system, for example. The hibernation file is allocated in a user partition on the hard disk as a file in a same level as a user file. A hibernation file may be created on the hard disk using a file creating utility program (normally, an executable program in the form of an EXE file), for example.

The hibernation information storing area is shown as if it is a bulk of block consisting of consecutive addresses in FIG. 4 for the purpose of convenience. However, it may be scattered into clusters of discrete addresses chained by file allocation information such as FAT (File Allocation Table) so long as it is a "hibernation file".

The hibernation managing information storing area exists in a place physically fixed on the hard disk (outermost or innermost cylinder or a specific sector in the cylinder). This is because a boot sector exists in the outermost cylinder while user data exists in the innermost cylinder so that data A' in the cylinder or the sector has to be sheltered to the hibernation information storing area before the cylinder or the sector is utilized as a hibernation information storing area.

Figure 7:
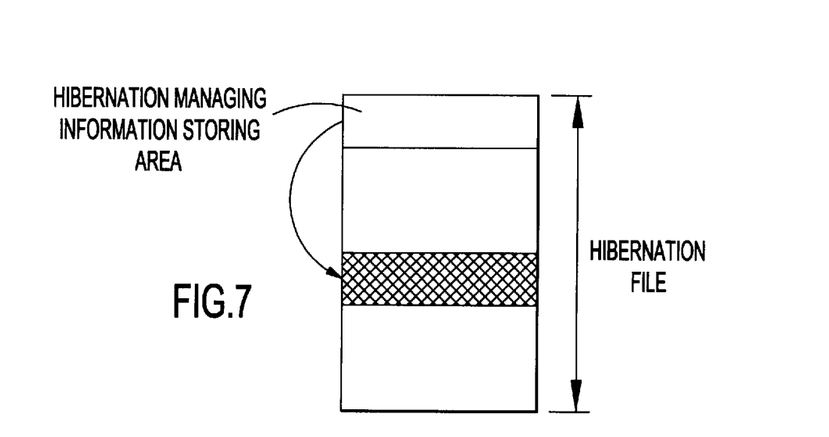
FIG. 7 is a diagram showing the manner in which the hibernation information storing area (hibernation file) is allocated in overlap with the hibernation managing information storing area.

While FIG. 4 is so depicted that the hibernation information storing area (hibernation file) is not overlapped with the hibernation managing information storing area, they may happen to be incidentally allocated on a same physical address on the hard disk. This is because the physical address of the hibernation managing information storing area is fixed while the hibernation information storing area is allocated totally independently of a physical address using a utility program, etc. Nevertheless, there is no problem of operation because the data originally existing in the hibernation managing information storing area has been sheltered (FIG. 7).

D. Supplement

This invention has been described in detail with reference to a specific embodiment in the above. However, it is evident that various modifications and alterations of the embodiment are obvious to those skilled in the art without departing the gist of this invention. While an example where this invention is applied to a personal computer has been described in this specification, it will be readily understood that this invention may be applied to an information handling system of a type which is capable of saving and restoring the state of the system.

While the embodiment has been described on the basis of a so called PC/AT compatible machine (PC/AT is a trademark of International Business Machines Corporation) conforming to the OADG specification, it should be understood that this invention may be equally practiced with machines of another type (for example, PC98 series of NEC, Mckintosh of Apple Corporation, a machine compatible to these machines, and a special purpose machine for a specific use).

This invention has been disclosed in the form of an example and should not be interpreted with restriction. The claims written in the beginning of this specification should be referred to in order to determine the gist of this invention.

As described in detail, this invention provides an improved information handling system implementing a low power consumption technology in which a task under execution is interrupted upon occurrence of a predetermined event and a state of almost completely stopping the system operation (i.e., low power consumption mode) is entered, and a method of controlling the same.

This invention also provides an improved information handling system which saves the system state in an external storage device such as a hard disk to shift to a low power consumption mode and returns to the original operation mode by restoring the saved state and a method of controlling the same.

This invention further provides an information handling system which is capable of saving the system state without destructing other user data on the external storage device and a method of controlling the same.

What is claimed is:

1. An information handling system provided with a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising;

(a) means for saving hibernation information including the content of said memory in a hibernation information storing area in said external storage device, (b) a hibernation managing information storing area provided in a fixed place in said external storage device, (c) means for sheltering data existing in said hibernation managing information storing area to said hibernation information storing area in response to occurrence of said predetermined event, (d) means for storing the hibernation managing information in said hibernation managing information storing area after the data has been sheltered by said means (c), and (e) means for stopping electric feeding to parts in the system after said means (a), (c) and (d) have executed their functions.

2. An information handling system provided with a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising;

(a) means for saving hibernation information including the content of said memory in a hibernation information storing area in said external storage device, (b) a hibernation managing information storing area provided in a fixed place in said external storage device, (c) means for sheltering data existing in said hibernation managing information storing area to said hibernation information storing area in response to occurrence of said predetermined event, (d) means for storing the hibernation managing information in said hibernation managing information storing area after the data has been sheltered by said means (c), (e) means for stopping electric feeding to parts in the system to cause the system to shift to the hibernation mode after said means (a), (c) and (d) have executed their functions, (f) means for checking said hibernation managing information stored in said hibernation managing information storing area in response to resumption of feeding power to the system, (g) means for restoring said hibernation information saved in said hibernation information storing area to the original places in response to successful completion of checking by said means (f), and (h) means for returning data sheltered to said hibernation information storing area to said hibernation managing information storing area in response to successful completion of checking by said means (f).

3. An information handling system of either claim 1 or claim 2 in which said hibernation managing information includes a hibernation signature indicating a history in which said information handling system stopped power feeding by a hibernation function.

4. An information handling system of either claim 1 or claim 2 in which said hibernation managing information includes positional information of said hibernation information storing area in said external storage device.

5. An information handling system of either claim 1 or claim 2 in which said hibernation managing information includes system configuration information of said information handling system.

6. An information handling system of claim 2 in which said means (f) checks whether or not said hibernation managing information indicates that the information handling system is in a hibernation mode.

7. An information handling system of claim 2 in which said means (f) checks whether or not the system configuration information included in said hibernation managing information coincides that of said information handling system.

8. An information handling system of claim 2 in which said means (g) executes restoration process according to the allocation information included in said hibernation managing information.

9. An information handling system of either claim 1 or claim 2 in which said hibernation managing information storing area is located in a cylinder which is defined in the outermost or the innermost area of said external storage device.

10. An information handling system of either claim 1 or claim 2 in which data sheltered to said hibernation information storing area by said means (c) is a boot sector describing partition information (a start address and the size of each partition) of said external storage device.

11. A method of controlling an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the method comprising the steps of;
 (a) saving hibernation information including the content of said memory in a hibernation information storing area in said external storage device,
 (b) providing a hibernation managing information storing area in a fixed place in said external storage device,
 (c) sheltering data existing in said hibernation managing information storing area to said hibernation information storing area in response to occurrence of said predetermined event,
 (d) storing the hibernation managing information in said hibernation managing information storing area after the data has been sheltered by said step (c), and
 (e) stopping electric feeding to parts in the system after said steps (a), (c) and (d) have been executed.

12. A method of controlling an information handling system comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the information handling system comprising the steps of;
 (a) saving hibernation information including the content of said memory in a hibernation information storing area in said external storage device,
 (b) providing a hibernation managing information storing area in a fixed place in said external storage device,
 (c) sheltering data existing in said hibernation managing information storing area to said hibernation information storing area in response to occurrence of said predetermined event,
 (d) storing the hibernation managing information in said hibernation managing information storing area after the data has been sheltered by said step (c),
 (e) stopping electric feeding to parts in the system to cause the system to shift to the hibernation mode after said steps (a), (c) and (d) have been executed,
 (f) checking said hibernation managing information stored in said hibernation managing information storing area in response to resumption of feeding power to the system,
 (g) restoring said hibernation information saved in said hibernation information storing area to the original places in response to successful completion of checking by said step (f), and
 (h) returning data sheltered to said hibernation information storing area to said hibernation managing information storing area in response to successful completion of checking by said step (f).

13. A method of controlling an information handling system of either claim 11 or claim 12 in which said hibernation managing information includes a hibernation signature indicating a history in which said information handling system stopped power feeding by a hibernation function.

14. A method of controlling an information handling system of either claim 11 or claim 12 in which said hibernation managing information includes positional information of said hibernation information storing area in said external storage device.

15. A method of controlling an information handling system of either claim 11 or claim 12 in which said hibernation managing information includes system configuration information of said information handling system.

16. A method of controlling an information handling system of claim 12 in which said step (f) checks whether or not said hibernation managing information indicates that the information handling system is in a hibernation mode.

17. A method of controlling an information handling system of claim 12 in which said step (f) checks whether or not the system configuration information included in said hibernation managing information coincides that of said information handling system.

18. A method of controlling an information handling system of claim 12 in which said step (g) executes restoration process according to the allocation information included in said hibernation managing information.

19. A method of controlling an information handling system of either claim 11 or claim 12 in which said hibernation managing information storing area is located in a cylinder which is defined in the outermost or the innermost area of said external storage device.

20. A method of controlling an information handling system of either claim 11 or claim 12 in which data sheltered to said hibernation information storing area by said step (c) is a boot sector describing partition information (a start address and the size of each partition) of said external storage device.

21. A computer readable storage medium storing in a tangible form a computer program running on a computer system of a type comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the said computer program comprising;
 (a) a routine for saving hibernation information including the content of said memory in a hibernation information storing area in said external storage device, (b) a routine for providing a hibernation managing information storing area in a fixed place in said external storage device, (c) a routine for sheltering data existing in said hibernation managing information storing area to said hibernation information storing area in response to occurrence of said predetermined event, (d) a routine for storing the hibernation managing information in said hibernation managing information storing area after the data has been sheltered by said routine (c), and (e) a routine for stopping electric feeding to parts in the system after said routines (a), (c) and (d) have been executed.

22. A computer readable storage medium storing in a tangible form a computer program running on a computer system of a type comprising a CPU, a volatile memory and a non-volatile external storage device, and supporting a hibernation function which interrupts a task under execution in response to occurrence of a predetermined event, saves hibernation information including the content of said memory in a hibernation information storing area in said external storage device, stops electric feeding to parts in the system, and then causes the system to shift to a hibernation mode, the said computer program comprising;

(a) a routine for saving hibernation information including the content of said memory in a hibernation information storing area in said external storage device, (b) a routine for providing a hibernation managing information storing area in a fixed place in said external storage device, (c) a routine for sheltering data existing in said hibernation managing information storing area to said hibernation information storing area in response to occurrence of said predetermined event, (d) a routine for storing the hibernation managing information in said hibernation managing information storing area after the data has been sheltered by said routine (c), and (e) a routine for stopping electric feeding to parts in the system after said routines (a), (c) and (d) have been executed, (f) a routine for checking said hibernation managing information stored in said hibernation managing information storing area in response to resumption of feeding power to the system, (g) a routine for restoring said hibernation information saved in said hibernation information storing area to the original places in response to successful completion of checking by said routine (f), and (h) a routine for returning data sheltered to said hibernation information storing area to said hibernation managing information storing area in response to successful completion of checking by said routine (f).

23. A computer readable storage medium of either claim 21 or claim 22 in which said hibernation managing information includes a hibernation signature indicating a history in which said information handling system stopped power feeding by a hibernation function.

24. A computer readable storage medium of either claim 21 or claim 22 in which said hibernation managing information includes positional information of said hibernation information storing area in said external storage device.

25. A computer readable storage medium of either claim 21 or claim 22 in which said hibernation managing information includes system configuration information of said information handling system.

26. A computer readable storage medium of claim 22 in which said routine (f) checks whether or not said hibernation managing information indicates that the information handling system is in a hibernation mode.

27. A computer readable storage medium of claim 22 in which said routine (f) checks whether or not the system configuration information included in said hibernation managing information coincides that of said information handling system.

28. A computer readable storage medium of claim 22 in which said routine (g) executes restoration process according to the allocation information included in said hibernation managing information.

29. A computer readable storage medium of either claim 21 or claim 22 in which said hibernation managing information storing area is located in a cylinder which is defined in the outermost or the innermost area of said external storage device.

30. A computer readable storage medium of either claim 21 or claim 22 in which data sheltered to said hibernation information storing area in said routine (c) is a boot sector describing partition information (a start address and the size of each partition) of said external storage device.

* * * * *